United States Patent [19]

Schreiter et al.

[11] Patent Number: 4,978,165
[45] Date of Patent: Dec. 18, 1990

[54] MOTOR VEHICLE ROOF WITH A ROOF OPENING THAT CAN BE CLOSED BY A COVER

[75] Inventors: Thomas Schreiter, Munich; Arpad Fuerst, Germering; Bernhard Wingen, Feldkirchen, all of Fed. Rep. of Germany

[73] Assignee: Webasto AG Fahrzeugtechnik, Fed. Rep. of Germany

[21] Appl. No.: 460,544

[22] Filed: Jan. 3, 1990

[30] Foreign Application Priority Data

Feb. 2, 1989 [DE] Fed. Rep. of Germany ....... 3903035

[51] Int. Cl.⁵ .............................................. B60J 7/047
[52] U.S. Cl. .................................... 296/216; 296/214; 296/220; 296/223; 296/224; 296/222
[58] Field of Search ................. 296/214, 216, 220–224

[56] References Cited

U.S. PATENT DOCUMENTS 4,911,497  3/1990  Schreiter et al. ............... 296/223 X

FOREIGN PATENT DOCUMENTS

3149977  6/1983  Fed. Rep. of Germany ...... 296/220
3311453  10/1983  Fed. Rep. of Germany .

Primary Examiner—Dennis H. Pedder
Attorney, Agent, or Firm—Sixbey, Friedman, Leedom & Ferguson

[57] ABSTRACT

Motor vehicle roof with a roof opening made in a fixed roof skin which can be closed or at least partially opened as desired by a cover. The cover can be pushed out into a raised ventilation position, in which its rear edge is located above the fixed roof skin, by being pivoted around an axis lying at or near its front edge and can, then, be slid rearward above the roof skin into a slid-back position. Additionally, the cover can be pivoted around an axis lying at or near its rear edge into a lowered ventilation position in which the cover front edge is lowered below the roof skin.

33 Claims, 9 Drawing Sheets

MOTOR VEHICLE ROOF WITH A ROOF OPENING THAT CAN BE CLOSED BY A COVER

BACKGROUND OF THE INVENTION

The invention relates to a motor vehicle roof with a roof opening made in a fixed roof surface, an opening which can be closed or at least partially opened by a cover as desired, and the cover, by pivoting around an axis located at or near its front edge, can be lifted, so that its rear edge is located above the fixed roof surface, and can be slid rearward above the roof surface.

Motor vehicle roofs of this kind are known as so-called spoiler or top ridge sliding roofs (see, e.g., German Offenlegungsschrift No. 33 11 452). However, such known motor vehicle roofs leave something to be desired from a ventilating engineering viewpoint. In particular, in the ventilation position, during rapid travel, relatively loud wind noises occur, and the aerodynamic behavior of the motor vehicle is negatively affected (increase of the $C_D$ value).

In commonly assigned, allowed U.S. patent application Ser. No. 320,549, filed Mar. 8, 1989, a ventilator roof is disclosed of the type having an opening in a fixed roof surface that can be closed by a single cover which, by pivoting around a pivot axis located at or near its rear edge, can be swung down into a ventilating position wherein the front edge of the cover is below the fixed roof surface while the rear edge remains approximately at the height of the fixed roof surface. Furthermore, from this position, the rear edge can be lowered and then the entire roof slid back under the fixed roof surface. Such a roof maintains favorable aerodynamic properties with improved ventilation engineering conditions, but lacks the advantages associated with a spoiler type roof.

SUMMARY OF THE INVENTION

The invention has a primary object of providing a motor vehicle roof which, while retaining the known advantages of a spoiler roof (uncovering the roof opening as desired and thus conveying a feeling of travel similar to that in a convertible without sacrificing headroom for back seat passengers), guarantees ventilation of the motor vehicle interior with improved ventilation engineering conditions in a way that is especially favorable aerodynamically.

This object is achieved, according to the invention, by providing a spoiler type motor vehicle roof with a cover which, in addition to having a pivot axis at or near its front edge, allowing the rear edge of the cover to pivot above the roof surface to at least partially uncover the roof opening, the cover, additionally, comprises a pivot axis lying at or near its rear edge, about which the cover can be pivoted into a ventilation position in which the cover front edge is lowered underneath the roof surface.

The motor vehicle roof according to the invention makes it possible to form a ventilation gap in the area of the front edge of the roof opening, and thus, near the front end of the fixed roof skin. This is advantageous, from a ventilation engineering viewpoint, for deicing and defogging (removing condensation) from the front windshield. This ventilation gap is located in the zone of the highest ventilating pressure, guaranteeing an effective ventilation, while preventing the driver and passengers from being bothered by an air draft resulting from the ventilation position of the cover. Also, wind noises occurring in this ventilation position are especially low.

Ventilation is performed by the invention without cover parts projecting upward above the roof surface, which is accompanied by an aerodynamically favorable travel behavior, especially at high rates of speed. At the same time, the cover can also, in the way usual for spoiler roofs, have its rear edge raised and shifted rearward above the fixed roof surface, more or less, to uncover the roof opening, without losing headroom for back seat passengers in doing so. The solution according to the present invention is, itself, excellently suited for short auto roofs.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
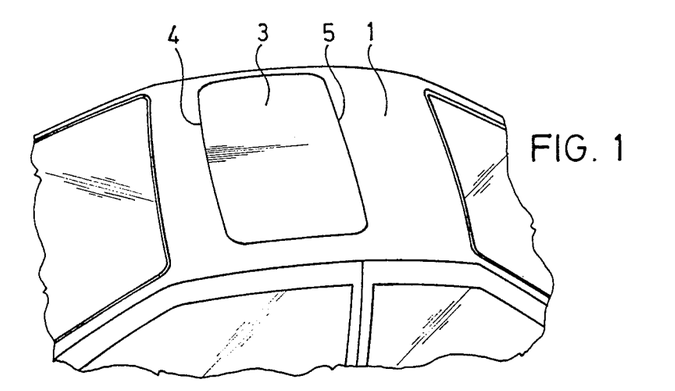
FIGS. 1-3 are partial perspective views of a motor vehicle with a roof according to the present invention with the cover in closed, venting, and open positions, respectively.
Figure 2:
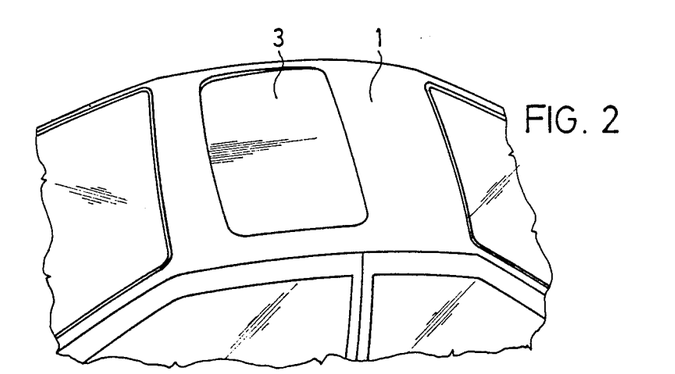
Figure 3:
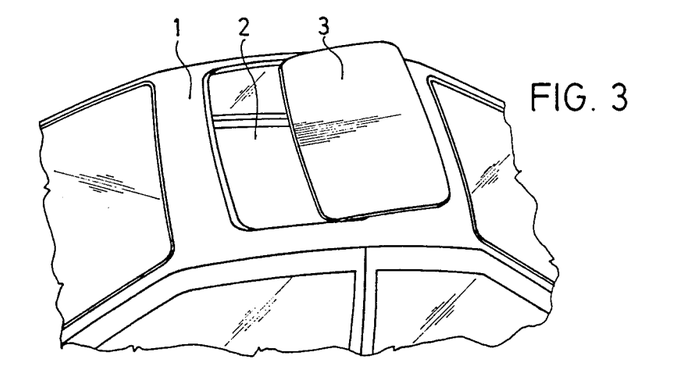
Figure 4:
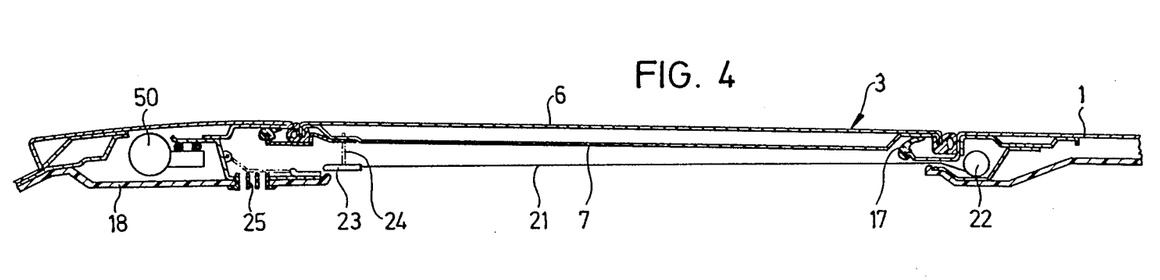
FIGS. 4 to 7 are diagrammatic, longitudinal cross-sectional views through an embodiment of a motor vehicle roof according to the invention in various cover positions, those of FIGS. 4, 5 and 7 corresponding to those of FIGS. 1-3, respectively.

As shown in FIGS. 1 to 3, a roof opening 2 is made in a fixed roof skin 1 Roof opening 2 can be closed by a rigid cover 3 (FIG. 1). Like a so-called spoiler roof, the cover can, by pivoting around an axis located at or near its front edge 4, be lifted at its rear edge 5 out into the open position above roof skin 1, from Which it can be pushed rearward over the roof surface (FIG. 3). In this way, more or less of the roof opening 2 is exposed. Additionally, as desired, cover 3 can also be pivoted around an (imaginary) pivot axis, located at or near its rear edge 5, into a ventilation position in which the front edge 4 of the cover 3 is lowered below roof skin 1 (FIG. 2).

The various cover positions can be seen again more clearly in FIGS. 4 to 7. In this embodiment, cover 3 is illustrated as a sheet metal cover having an outer cover sheet 6 and an inner cover sheet 7. Cover 3 has a drip molding 8 in the area of its front edge 4 (labeled in FIG. 7). In the forward positions of cover 3 shown in FIGS. 4 and 6, this drip molding 8 catches under fixed roof skin 1. In doing so, a seal 9, that is mounted on front edge 10 of drip molding 8, is pressed against the underside of fixed roof skin 1. Cover 3 is further provided with a cover seal 11 surrounding its periphery. Seal 11, in the embodiment illustrated, is a hollow chamber seal that is mounted on a downwardly bent edge 12 of cover 3 so that it is held, in the area of the front edge of the cover, between edge 12 and drip molding 8.

Laterally and to the rear of roof opening 2, fixed roof skin 1 forms an essentially vertical sealing surface 13, which delimits roof opening 2 and against which an outer side of seal 11 lies in the closed cover position. In contrast, on front edge 14 of roof opening 2, fixed roof skin 1 is flat to make it possible to produce, in the ventilation position of cover 3 represented in FIG. 5, a front ventilation gap 15 between front edge 14 of roof opening 2 and front edge 4 of cover 3. On the front of sealing surface 13, a forwardly extending drip molding 16 is attached which, when cover 3 is in the forward positions of FIGS. 4,5, catches under rear edge 5 of cover 3. On the front edge of drip molding 16 a seal 17 is provided that engages with the underside of cover 3 when the cover is closed (FIG. 4) or is in its ventilation position (FIG. 5).

Beneath fixed roof skin 1, a fixed inside roof headlining 18 is mounted which has a lining opening 19 located beneath roof opening 2. The lining opening 19 can be closed by a retractable headliner. In the embodiment illustrated, a roller blind device, designated overall by 20, is provided as the retractable headliner. Roller blind device 20 comprises a roller blind fabric web 21 that can be wound and unwound from a roller 22 as desired. Roller 22 is placed crosswise to the cover sliding direction, rearward of roof opening 2 and lining opening 19, between the roof skin 1 and the fixed inside roof headlining 18. The front, exposed end of roller blind fabric web 21, or a roller blind edge member 23 connected to it, is coupled to cover 3 by a carrier arrangement 24 located on edge member 23. The carrier arrangement 24 makes possible a height adjustment of cover 3 relative to roller blind fabric web 21. An elongated ventilation screen or grill 25 runs crosswise to the sliding direction of cover 3, and is inserted in a cutout of fixed inside headlining 18 that is located in front of lining opening 19.

Figure 5:
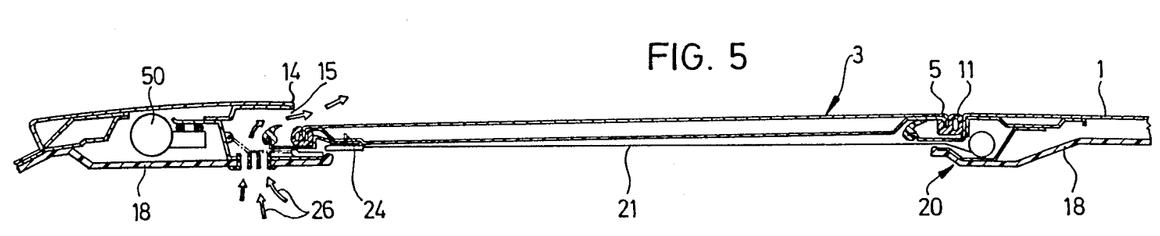
Figure 6:
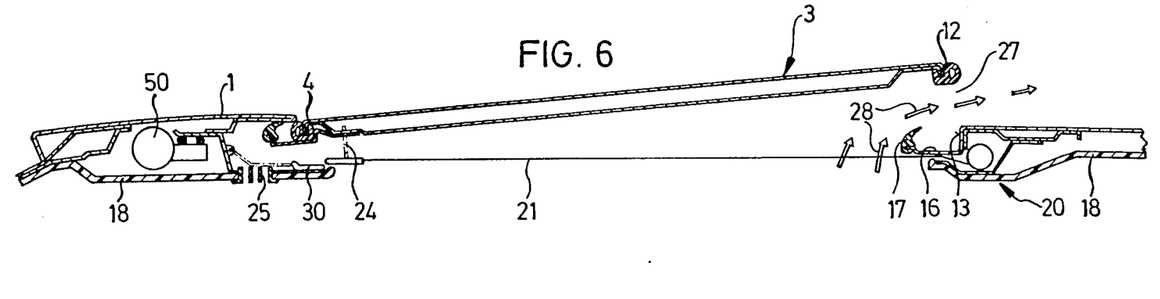
Figure 7:
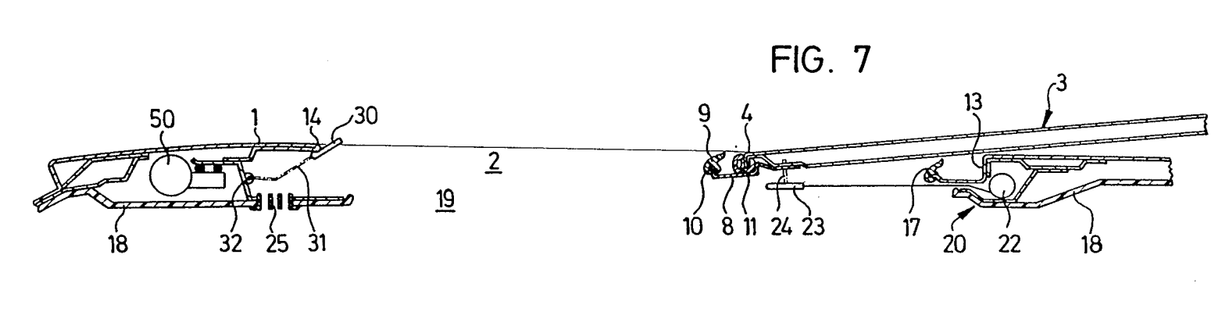

When front edge 4 of cover 3 is lowered into the ventilation position according to FIG. 5 and, as the vehicle travels, a ventilating pressure is produced in the outside of fixed roof skin 1, in its front area, which is less than the pressure prevailing in the vehicle interior, an air current is formed, as indicated by arrows 26 in FIG. 5 . This air current exits the passenger compartment of the vehicle through ventilation screen 25 and front ventilation gap 15. When cover 3 is pivoted into the ventilation position according to FIG. 5, as shown, rear edge 5 of the cover is held at least approximately at the height of fixed roof surface 1. As can be seen from a comparison of FIGS. 5, 6 and 7, during displacement of the cover 3 from the ventilation position (FIG. 5) toward the raised and slid-back open position (FIG. 7), the cover front edge moves upwardly, and the cover rear edge 5 is pushed out above roof surface 1, so that, before pushing cover 3 back, a rear ventilation gap 27 is produced between the rear edge 5 and the roof skin 1 (FIG. 6). An air current indicated in FIG. 6 by arrows 28 can penetrate through ventilation gap 27 in this cover position.

In the area of front edge 14 of roof opening 2, a wind deflector 30 is placed that can be pivoted by swivel arms 31 around a hinge pin 32. Wind deflector 30 is moved, depending on the cover sliding movement, between the rest position illustrated in FIGS. 4 to 6 and a working position shown in FIG. 7, by a mechanism that can be made in any way known in the art.

Figure 8:
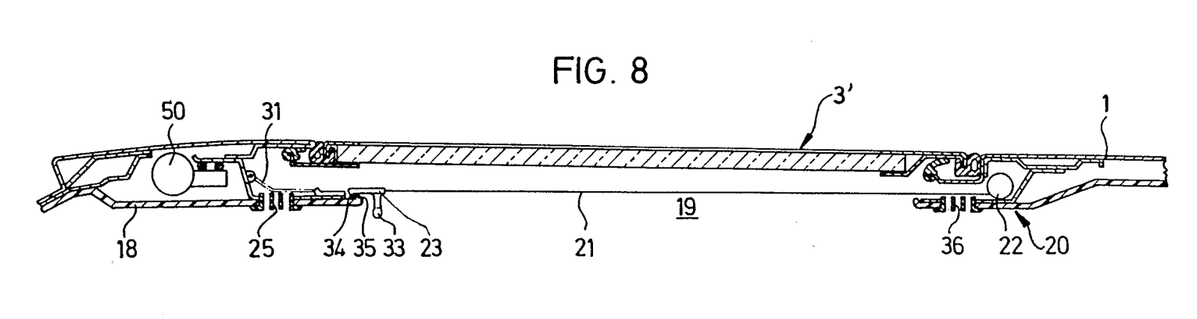
FIG. 8 is a view corresponding to FIG. 4, but showing a modified roof embodiment.

FIG. 8 shows the use of a cover 3' made of translucent or transparent material (i.e., a so-called glass cover). In this embodiment, carrier arrangement 24 is eliminated. Instead, a handle 33 is provided on roller blind edge member 23 that makes it possible to operate roller blind device 20 independently of the cover sliding position. To retain the roller blind fabric web 21 in the pulled-out position, a catch hook 34 is provided on the front end of edge member 23, for example. The catch hook 34 interacts with a block or lip 35 that is integral with the roof lining 18.

It is noted that, optionally, means can also be present that permit a detachable setting of the roller blind fabric web in one or more predetermined intermediate positions. In the embodiment according to FIG. 8, there is provided, in addition to ventilation screen 25, an elongated ventilation screen 36 that is inserted in an opening of fixed inside roof lining 18' that runs crosswise to the sliding direction of cover 3' rearwardly of lining opening 19. When cover 3' is pushed out so that its rear edge 5 is above roof surface 1, as in FIG. 6, an air current can flow outwardly through ventilation screen 36. So as not to impede this air current, even when roller blind device 20 is pulled out, roller blind fabric web 21 can be provided with a corresponding opening or pattern of openings, in the area lying above the ventilation screen 36 in its pulled out state.

The cover 3 is forced to execute the movements explained above by a displacement mechanism. Preferred embodiments of this displacement mechanism are explained in more detail below. It is noted, in this connection, that the displacement mechanism comprises suitable guide and displacement means which are provided on both sides of the cover and of the roof opening, preferably, in mirror symmetry to one another. For this reason, only the displacement mechanism is described relative to only one side of the cover.

In the case of the embodiment according to FIGS. 9 to 17, in each case, a guide rail 38 extends along the respective side edge of roof opening 2, below fixed roof surface 1, and which is integral with the motor vehicle. Guide rails 38 can, optionally, also be connected to one another by forming a frame that, from a top view is U-shaped or annular For this purpose, guide rail 38 is provided with a first guideway 40 at its edge that is closest to the roof opening 2, and a second guideway 41 at its opposite edge. Both of the guideways 40, 41 run parallel to the associated side edge of roof opening 2.

Figures 13, 14, 15:
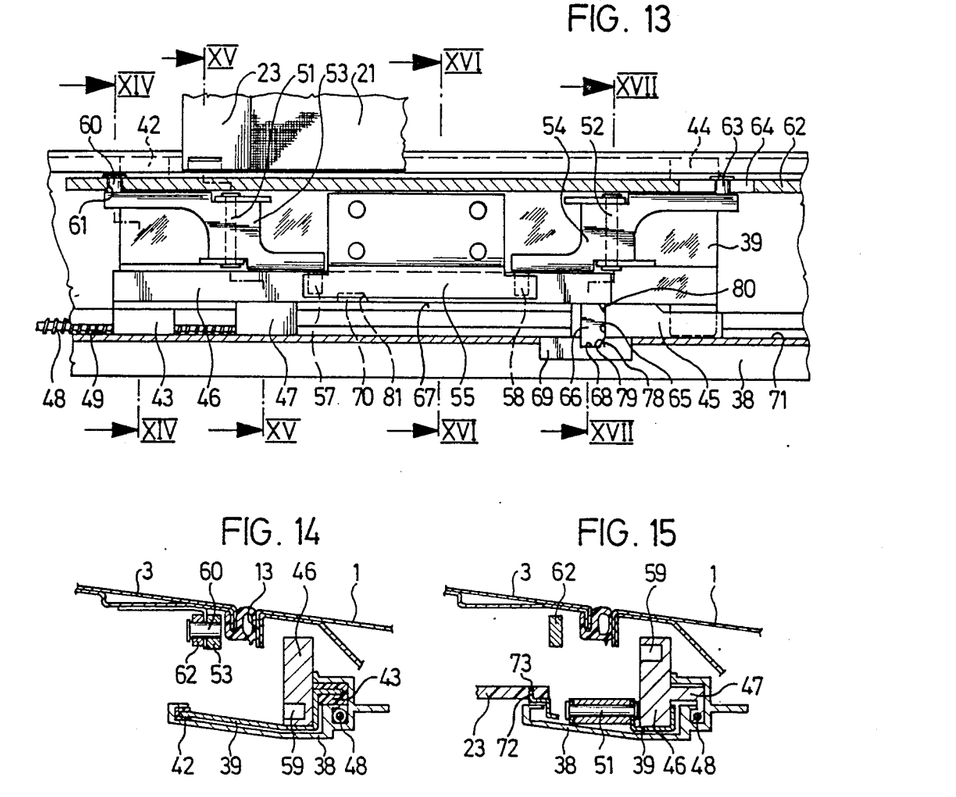
FIG. 13 is a partial top plan view of the displacement mechanism of FIGS. 9 to 12 with the cover in the closed position.
FIGS. 14 to 17 are sectional views taken along lines XIV—XIV, XV—XV, XVI—XVI or XVII—XVII, respectively, of FIG. 13.
Figure 16:
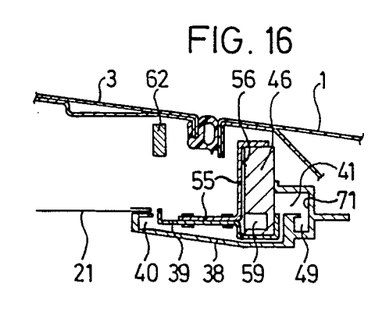
Figure 17:
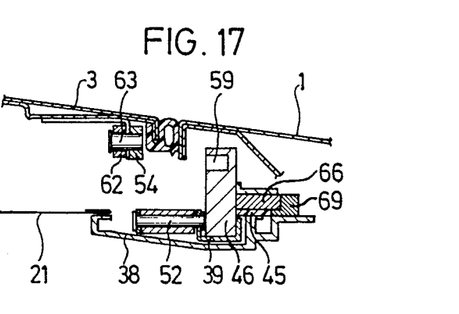

A front guide shoe 42, 43 and a rear guide shoe 44, 45 of sliding carriage 39 are slidably placed, respectively, in each of the two guideways 40, 41 (see especially FIGS. 13 and 14). A control link 46 is mounted to slide on sliding carriage 39 in the cover sliding direction. Control link 46 is joined with a pressure-resistant drive cable 48 by a carrier 47 (FIGS. 13 and 15). Drive cable 48, preferably made as a threaded cable, can be slid lengthwise in another guideway 49 of guide rail 38. Drive cable 48, like the corresponding drive cable on the other side of the roof, is displaced lengthwise by a drive motor 50 (FIGS. 4 to 8) that is placed between fixed roof surface 1 and inside roof lining 18 or 18' in front of roof opening 2, in the embodiment illustrated.

Sliding carriage 39 carries a front pivot pin 51 (FIGS. 13 and 15) that is oriented crosswise to the cover sliding direction, as well as a rear pivot pin 52 (FIGS. 13 and 17) which is disposed parallel to and longitudinally spaced along carriage 39 from pivot pin 51. A front, ventilation lever 53 is mounted to pivot on pivot pin 51, while a rear, ventilation lever 54 is mounted to pivot on rear pivot pin 52 around the axis of the pivot pin.

Between ventilation levers 53 and 54, a guide plate 55 is joined with sliding carriage 39 and forms, together with sliding carriage 39, a guideway 56 (FIG. 16) for control link 46. Pivot pins 51 and 52 each interact with the central area of ventilation lever 53 or of ventilation lever 54.

On the facing ends of ventilation levers 53 and 54, a respective link pin 57 or 58 is provided running parallel to pivot pins 51 and 52. Link pins 57 and 58 engage in a curved track 59 of control link 46. On the front end of front ventilation lever 53, a hinge pin 60 is placed that is oriented parallel to pivot pin 51 and that is mounted to pivot in a cylindrical opening 61 of a cover carrier 62 that is connected to cover 3. Rear ventilation lever 54 carries, on its rear end, a hinge pin 63 which is oriented parallel to pivot pin 52. Hinge pin 63 is guided to pivot and slide lengthwise in a slot 64 of cover carrier 62 that extends in the lengthwise direction of cover 3.

A latch 66 is slidably guided in guideway 41, crosswise to the cover sliding direction, in an upwardly open crosswise slot 65 (FIG. 13) of rear guide shoe 45. As long as cover 3 is in a forwardmost position, i.e., is in the closed position (FIG. 9), the first ventilation position (in which the front edge of the cover is lowered; FIG. 10), the second ventilation position (in which the rear edge of the cover is raised; FIG. 11), or an intermediate position between these positions, the side surface 67 of control link 46 holds latch 66 in the position, illustrated in FIGS. 13 and 17, in which latch 66 is engaged in a recess 68 of a stop 69. Stop 69 is integral with guide rail 38.

If, starting from the position shown in FIG. 11, control link 46 is pushed further to the rear, a force is exerted on latch 66 that causes latch 66 to make a movement crosswise to the cover sliding direction. This movement disengages latch 66 from stop 69 and causes the opposite end (which faces away from stop 69) to be inserted into a recess 70 of control link 46, instead. In this way, sliding carriage 39 is slaved to control link 46. This slaving is maintained by latch 66 lying against a side surface 71 of guideway 41, until cover 3 again reaches forwardmost, second ventilating, position of FIG. 11 from its pushed-back position.

The embodiment according to FIGS. 9 to 17 differs from the one according to FIGS. 4 to 7 with respect to operation of roller blind device 20. That is, carrier arrangement 24 is omitted and, instead, roller blind edge member 23 is coupled with sliding carriage 39. For this purpose, as shown in FIG. 15, an upward projecting catch 72 of sliding carriage 39 engages in a recess 73 of edge member 23.

The adjustment mechanism illustrated in FIGS. 9 to 17 functions as follows. When control link 46, constantly slaved to drive cable 48, is brought into its forward position according to FIG. 9 by drive motor 50 and drive cable 48, link pin 57 is at the lowest point of curved track 59, causing front ventilation lever 53 to raise the cover front edge 4 so far that, heightwise, it is flush with front edge 14 of roof opening 2. Simultaneously, rear ventilation lever 54, by interaction of link pin 58 with curved track 59, holds the cover rear edge 5 at the height of fixed roof skin 1 in the area of the rear edge of roof opening 2.

Figure 9:
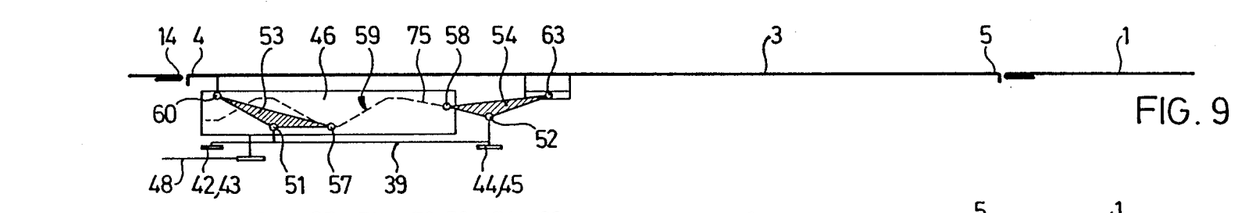
FIGS. 9-12 are diagrammatic, longitudinal cross sections, corresponding to the cover positions of FIGS. 4 to 7, illustrating a first embodiment of a displacement mechanism for the cover.
Figure 10:
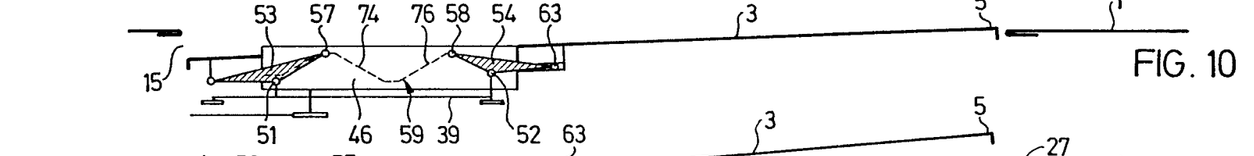
Figures 11, 12:
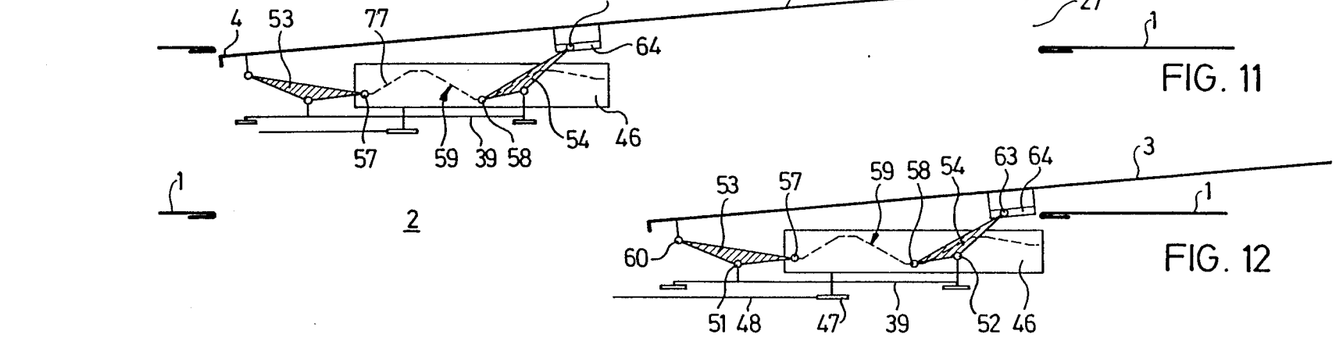

If, starting from the closed cover position of FIG. 9, control link 46 is pushed rearward by drive cable 48 into the position according to FIGS. 10 and 13, a misalignment of sliding carriage 39 is prevented by the engagement of latch 66 with stop 69. Link pin 57 travels upward along a forward-ascending part 74 of curved track 59. In this way, front ventilation lever 53 is pivoted counterclockwise around pivot pin 51; see FIGS. 9 & 10. As a result, hinge pin 60 pulls down on front edge of cover 3. Simultaneously, the link pin 58 moves along a part 75 of the curved track 59 which ascends, in front, less steeply than curved track part 74. This causes a clockwise pivoting movement of rear ventilation lever 54 that is less than the pivoting movement of ventilation lever 53 (in FIGS. 9 and 10). Furthermore, the inclines of curved track parts 74 and 75 are coordinated relative to each other so that the rear edge 5 of the cover is kept at least approximately at the height of fixed roof surface 1 (FIG. 10) during lowering of the front edge 4 of the cover. Thus, an air current 26 can penetrate through front ventilation gap 15, as explained previously relative to FIG. 5.

If, starting from the position shown in FIG. 10, control link 46 is pushed further rearward (FIG. 11), sliding carriage 39 remains stopped by latch 66 relative to guide rail 38. Link pin 58 travels downward on a forwardly-descending part 76 of curved track 59, so that rear ventilation lever 54 is pivoted counterclockwise around rear pivot pin 52 (compare FIGS. 10 and 11). The interaction between hinge pin 63 and slot 64 causes the rear edge 5 of cover 3 to be pushed above fixed roof skin 1. Simultaneously, link pin 57 travels along a part 77 of curved track 59, that also descends toward the front, causing a clockwise pivoting of front ventilation lever 53 (see FIGS. 10 and 11). In this way, the front edge 4 of the cover 3 is caused to make an upward-oriented movement, forming a rear ventilation gap 27 of predetermined opening width, and with the cover slant being kept relatively small. An air current 28 can penetrate ventilation gap 27, as explained previously relative to FIG. 6.

In the ventilation position according to FIG. 11, link pin 57 has reached the front end of curved track 59. If, starting from this position, control link 46 is slid further to the rear, control link 46 tries to take sliding carriage 39 along with it to the rear, by link pin 57 and ventilation lever 53. In this way, guide shoe 45 exerts a rearward-oriented force on latch 66. Because a slanted surface 78 of latch 66 lies against a correspondingly inclined slanted surface 79 of stop 69, a force component oriented crosswise to the sliding direction of control link 46 is produced. This crosswise force component causes latch 66 to be pushed out of recess 68 of stop 69. Additionally, the force causes the end of latch 66 which faces away from stop 69 to be pushed into recess 70, which is aligned with recess 68 in the crosswise direction.

In this way, the locking of sliding carriage 39 relative to guide rail 38 is released while, simultaneously, sliding carriage 39 is slaved with movement of control link 46, sliding carriage 39 and, with it, also, cover 3, are pushed rearward so as to partially to open roof opening 2 as shown in FIG. 12.

On the other hand, if the control link 46 is pushed forward from the position according to FIG. 12, the described movement operations occur in the reverse order. If control link 46 reaches the position shown in FIG. 11, slanted interacting surfaces 80 and 81 of latch 66 or of control link 46 cause a sliding of latch 66 into engagement with stop 69 as shown in FIG. 13.

The above explanation shows that the adjustment mechanism, with equidirectional operation in the one direction, first brings cover 3, starting from the closed position (FIG. 9), into the first ventilation position where front edge 4 is lowered (FIG. 10), then pushes out the rear edge 5 of cover 3 to form the second ventilation position (FIG. 11), and finally, slides the pushed-out cover rearward. Vice versa, with equidirectional operation in the opposite direction, the adjustment mechanism returns cover 3 from its slid-back position (FIG. 12), first, to its second ventilation position in which rear edge 5 is pushed-out (FIG. 11), after which cover 3 is moved back into the first ventilation position of FIG. 10, and finally, into the closed position (FIG. 9).

In the embodiment illustrated in FIGS. 9–17, the front ventilation lever 53 pivots relative to cover carrier 62, while rear ventilation lever 54 is connected so as to both pivot and slide lengthwise a limited distance relative to cover carrier 62. However, it should be understood that the arrangement could, alternatively, be reversed, so that rear ventilation lever 54 only pivots relative to cover carrier 62 while front ventilation lever 53 is connected so as to both pivot and slide lengthwise by a limited distance relative to cover carrier 62.

In FIGS. 18 to 27, another embodiment of the displacement mechanism is illustrated. The functional parts of this displacement mechanism are, again, placed in mirror symmetry relative to one another on both sides of the cover, so that a description for one side of the cover is sufficient.

Guide rails 84 extend along the side edges of roof opening 2 in the cover sliding direction. Similar to guide rails 38 of the embodiment described above, guide rails 84 lie partially under fixed roof skin 1 and partially under cover 3 in the closed position, and they can be assembled into a frame. Each guide rail 84 forms a cable duct 85 in which a pressure-resistant drive cable 48 is guided to slide lengthwise. A guideway 86 borders cable duct 85 in the crosswise direction.

A front sliding carriage 87 is guided to slide lengthwise in guideway 86. A ventilation lever 88 is pivotally joined to the front end of sliding carriage 87 by a hinge pin 89. A link pin 90 projects from a side of the ventilation lever 88, crosswise to the cover sliding direction, at its end opposite that with pin 90. On the side of ventilation lever 88 opposite that with link pin 90, a link pin 91 projects in axial alignment with pin 90. In the embodiment illustrated, link pins 90 and 91 can be connected to one another as one piece. Depending on the sliding position of sliding carriage 87, link pin 91 engages in guideway 86 of guide rail 84 or in an upwardly and forwardly curved guideway 92 that is connected to a front ventilation link 93 that is integral with the front end of guide rail 84.

Cover 3 is mounted on a cover carrier 94 that extends along the cover side edge. A front section 95 of cover carrier 94 extends laterally outwardly from the cover and underneath fixed roof skin 1. On the outer end of cover carrier section 95, relative to roof opening 2, a downwardly bent lug 96 is formed. A guideway 97 is formed in lug 96, along which link pin 90 is slidably guided.

A tension and pressure resistant coupling part, in the form of a cover stop bar 98, has a laterally bent, cylindrical, front end 99 which engages in a crosswise bore 100 of lug 96. The axis of crosswise bore 100 is approximately aligned with the cover front edge 4, and stop bar 98 can be pivoted around this axis with respect to cover carrier 94 and, thus, relative to the cover 3. On the other, rear end of cover stop bar 98, there are a pin 101 and an auxiliary catch 102. During the pivoting of cover 3 from the closed position (FIGS. 18 and 19) into the first ventilation position, where the cover front edge is lowered (FIGS. 20 and 21), as well as during the pushing out of the cover rear edge 5 above fixed roof surface 1, pin 101 engages in a recess 103 of a stop 104 that is attached to guide rail 84. Here, sliding carriage 87 prevents, with its top side 105, pin 101 from exiting recess 103.

Figures 20, 21, 22:
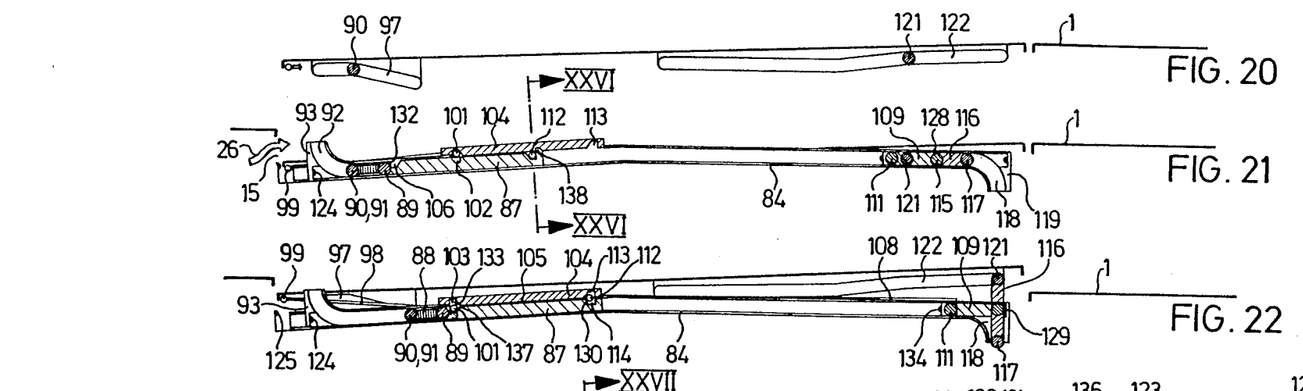
Figure 23:
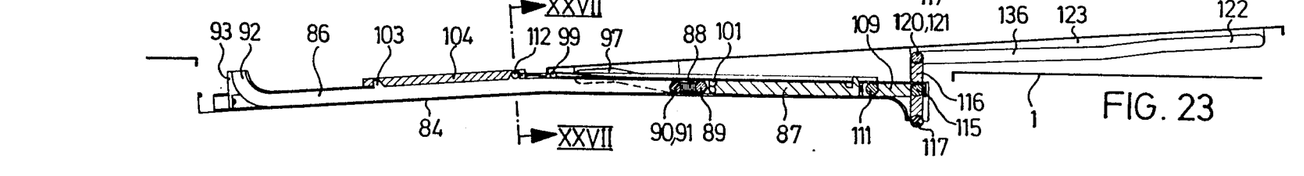
Figure 24:
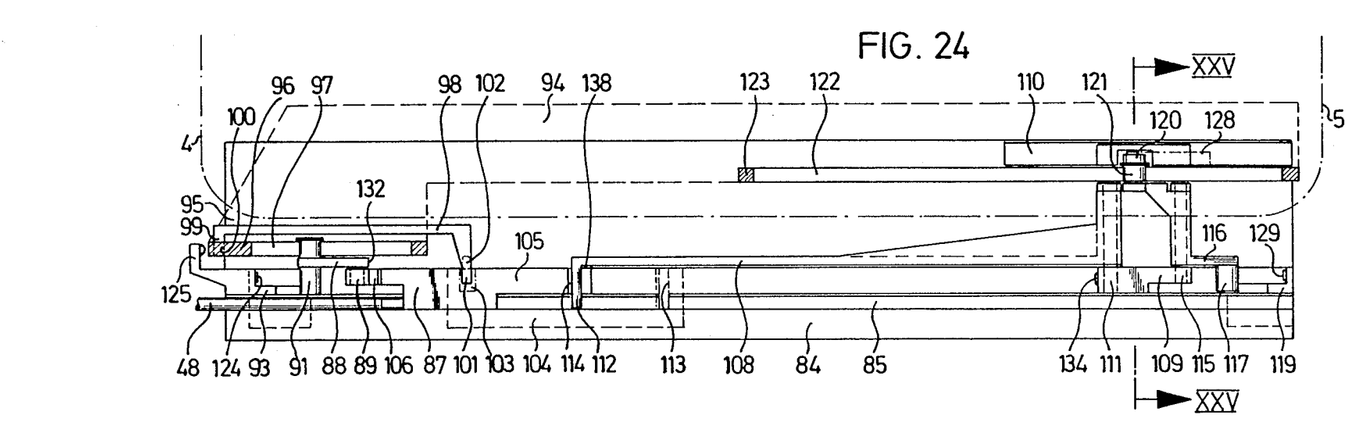
FIG. 24 is a partial, top plan view of the displacement mechanism of FIGS. 18 to 23 for the cover positions shown in FIGS. 20 and 21.
Figure 25:
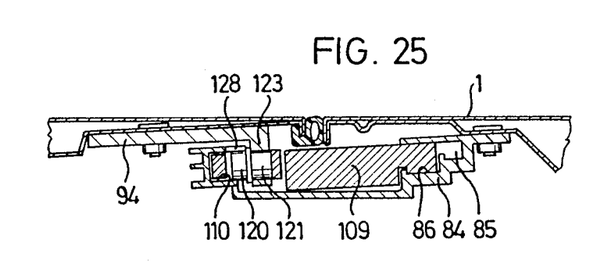
FIG. 25 is a section along line XXV—XXV of FIG. 24.

After sliding carriage 87 has traveled into the position illustrated in FIG. 22, pin 101 is forced to make a transition from recess 103 of stop 104 to a front recess 106 of sliding carriage 87. This causes cover 3 to be slaved, by stop bar 98, in a rearward direction with sliding carriage 87, and consequently, also with drive cable 48.

Front sliding carriage 87 can also be coupled to a rear sliding carriage 109 by another tension and pressure-resistant element in the form of a connecting bar 108. Sliding carriage 109, on its side directed outwardly relative to roof opening 2, is guided to slide, in the lengthwise direction of the guide rail, in guideway 86 and, on the opposite, inwardly facing side, to slide, parallel to guideway 86, of guide rail 84, in another guideway 110.

Connecting bar 108 is pivoted on the front end (relative to the lengthwise direction of the motor vehicle) of sliding carriage 109 by a hinge pin 111, which extends crosswise to the cover sliding direction. On the front end of connecting bar 108 there is a pin 112 which runs crosswise to the cover sliding direction and can be engaged, depending on the sliding movement of front sliding carriage 87, in either a rear recess 113 of stop 104 or a rear recess 114 of front sliding carriage 87. When pin 112 is engaged in recess 114 of sliding carriage 87, it projects into guideway 86 and cable duct 85 of guide rail 84, as can be seen especially from FIG. 26.

A rear ventilation lever 116 is pivoted on rear sliding carriage 109 by a hinge pin 115 running parallel to hinge pin 111 and located behind the latter. On the end of ventilation lever 116 (FIG. 19) lying in the rear in the closed cover position, there is a pin 117. Depending on the sliding position of sliding carriage 109, pin 117 engages in guideway 86 of guide rail 84 or in a guideway 118. Guideway 118 is connected to the rear end of guideway 86 and curves downwardly and to the rear in a rear ventilation link 119 that is integral with guide rail 84.

Ventilation lever 116 carries, on its end that is in front in the closed cover position, two pins 120 and 121, which may be optionally connected to one another as one piece. In the closed cover position, pin 120 is engaged in guideway 110 of guide rail 84 and, in this position, secures cover 3 against being torn out. On the other hand, pin 121 constantly engages in a link track 122 that extends in the lengthwise direction of the cover. Link track 122 of cover carrier 94 is disposed below a rear section 123 of cover 3. The displacement mechanism of FIGS. 18-27 operates as follows. When the front slide carriage 87 (which is permanently connected to drive cable 48)is brought into its forwardmost position by drive motor 50 and drive cable 48, the front end of front sliding carriage 87 strikes a limit stop 124 of front ventilation link 93. Front ventilation lever 88 is brought into an essentially vertical position (FIG. 19) in which the link pin 91 is located in the upper end of guideway 92, and the link pin 90 is located at the front end of the guideway 97. In this way, ventilation lever 88 holds the front edge area of cover 3 at the same height as the front part of the fixed roof skin 1 that borders the front of roof opening 2.

Additionally, pin 101 of cover stop bar 98 is held in front recess 103 of stop 104 by sliding carriage 87. In this way, cover 3 is secured against a sliding movement. Pin 112 on the front end of connecting bar 108 is held in the rear recess 114 of sliding carriage 87 by stop 104. Consequently, rear sliding carriage 109 is coupled to front sliding carriage 87. Rear ventilation lever 116 assumes a position aligned with the lengthwise direction of guide rail 84 in which pin 121 engages in link track 122 to hold the rear edge area of the cover 3 in heightwise alignment with fixed roof skin 1. Simultaneously, pin 121 is inserted into guideway 110 of guide rail 84, thereby securing cover 3 against being torn out.

In this embodiment, as illustrated, in the front area of guide rail 84, a limit stop 125 is provided that is integral with the roof. For example, a limit stop that interacts with the front end of cover carrier 94 in the closed cover position can be connected to guide rail 84 or front ventilation link 93.

Figures 18, 19:
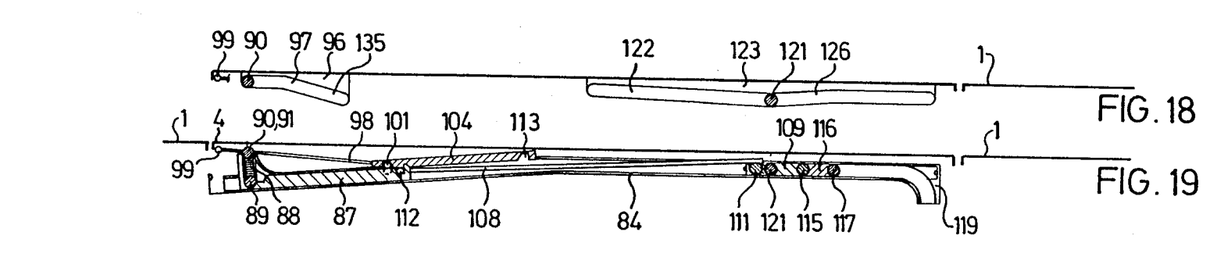
FIGS. 18 to 23 are diagrammatic, longitudinal sections through a motor vehicle roof showing a modified embodiment of the displacement mechanism for various cover positions, wherein FIGS. 18-20 separately show, for the positions of FIGS. 19, 21, respectively, the interaction of the cover-side links with the associated link pins.

If front sliding carriage 87 is slid rearward from its forwardmost position by drive cable 48, link pin 91 travels downward in guideway 92 of front ventilation link 93, causing front ventilation lever 88 to pivot in a counterclockwise manner around hinge pin 89, from the position shown in FIG. 19, to that shown in FIG. 21. As a result of the engagement between link pin 90 and guideway 97, the front edge 4 of cover 3 is lowered into the ventilation position according to FIGS. 20, 21 and 24. Pin 101 on the rear end of cover stop bar 98 is still held in engagement with front recess 103 of the stop 104 by the top side 105 of sliding carriage 87, so that cover 3, during its pivoting movement, cannot be slid. Because of the cover pivoting movement, front ventilation gap 15 is formed, through which air current 26 can penetrate.

Pin 112 of connecting bar 108 continues to be held in the rear recess 114 of sliding carriage 87 by the stop 104, so that rear sliding carriage 109 slides in tandem with the front sliding carriage 87. As a result, pin 121 of rear ventilation lever 116 travels along a slightly ascending rearward part 126 of link track 122 to keep the rear edge 5 of the cover 3 in heightwise alignment with the fixed roof skin 1 during the pivoting movement of the cover.

When the coupled sliding carriages 87 and 109 are slid further rearward, pin 117 of rear ventilation lever 116 moves downward in guideway 118 of rear ventilation link 119, causing ventilation lever 116 to pivot around hinge pin 115. In doing so, pin 120 exits this guideway, upwardly through a recess 128 in the upper limiting surface of guideway 110. The rear edge 5 of cover 3 is, thus, pushed out above fixed roof surface 1 by ventilation lever 116. Rear sliding carriage 109, finally, strikes the limit stop 129 with its rear end (FIG. 22), and at the same time, the pin 121 reaches the rear end of link track 122.

In this position, front recess 103 of stop 104 and front recess 106 of sliding carriage 87 overlap, while simultaneously, rear recesses 113 and 114 of stop 104 and of sliding carriage 87 are aligned with one another in the lengthwise direction. When sliding carriage 87 is slid a little further rearward, a bevel 130, which delimits the front of recess 114, pushes pin 112 out of recess 114 and upward into recess 113 of stop 104. In this way, the coupling between front sliding carriage 87 and rear sliding carriage 109 is terminated, and rear sliding carriage 109 is secured by connecting bar 108 against sliding with respect to guide rail 84.

Figures 26, 27:
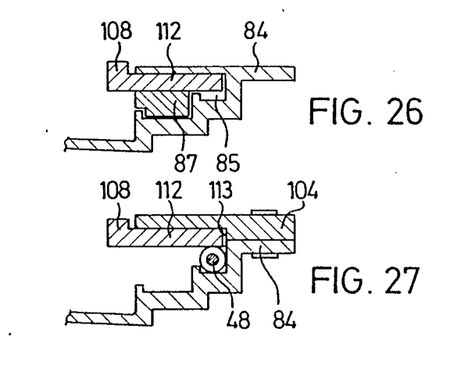
FIG. 26 is a section along line XXVI—XXVI of FIG. 21.
FIG. 27 is a section along line XXVII—XXVII of FIG. 23.

When sliding carriage 87 is slid further rearward, first the top side of sliding carriage 87, and then drive cable 48, prevent pin 112 from slipping out of recess 113 (FIGS. 26 and 27). Additionally, a compression cam 132 (FIG. 24) of front ventilation lever 88 strikes auxiliary catch 102, which lies below pin 101 of cover stop bar 98. In this way, by the interaction of pin 101 with a rear bevel 133 of recess 103, pin 101 is pushed out of recess 103 into recess 106 of sliding carriage 87. Consequently, the cover 3 is no longer restrained against sliding movements; and is, instead, cover 3 slaved by bar 98 to sliding carriage 87. Therefore, the cover 3 can, now, be pushed back over fixed roof surface 1 until front sliding carriage 87 strikes a limit stop 134 of rear sliding carriage 109 (FIG. 24), with the upper limiting surface of guideway 86 preventing the pin 101 from coming out of recess 106 as the sliding carriage 87 is slid further rearward.

The rear area 135 of the front guideway 97 slants downwardly to the rear, and serves to raise the cover front edge by a certain amount When the cover rear edge is pushed out (FIG. 22). Because rear link track 122 has a front section 136 that ascends forwardly and guide rail 84 is arched upward, it is assured that, when cover 3 is pushed back, the cover rear edge 5 does not rise excessively far above fixed roof skin 1.

The closing of cover 3 occurs in reverse order. When cover 3, starting from the position according to FIG. 23, reaches the position represented in FIG. 22, additional forward movement of the cover is prevented by limit stop 125. As soon as the pairs of recesses 103, 106 and 113, 114 of sliding carriage 87 and stop 104 are again made to overlap, a rear bevel 137 of front sliding carriage recess 106 presses pin 101 into recess 103, While a compression cam 138 of sliding carriage 87 forces pin 112 to move into rear recess 113 of stop 104. The cover 3 is, then, lowered into the ventilation position according to FIG. 21. With further forward movement of sliding carriage 87, the cover is finally raised back into the closed position.

In FIGS. 28 to 33, another embodiment of the motor vehicle roof of the present invention is shown that, to a great extent, is similar to that according to FIGS. 18 to 27. Consequently, only those features of this further modified embodiment which differ from that discussed above are explained below.

According to FIGS. 29 to 32, guide rails 84 are mounted on a frame 140. The rear end of frame 140 is connected by a hinge 142 to a reinforcement rail 141 that is integral With the fixed roof of the vehicle. This makes possible a pivoting movement of frame 140 around an axis running crosswise to the cover sliding direction. On the front end of frame 140 (left in FIGS. 29 to 32), there is placed a threaded sleeve that is connected to frame 140 by a joint 144.

An axially fixed, threaded pin 145 is rotatably connected by a bearing 146 to a part 147 that is integral with the roof. Threaded pin 145 engages in threaded sleeve 143 and its lower end is integrally connected to a turning handle 148 for producing a rotation of the pin 145 that displaces sleeve 143 along the length of the pin.

Figure 33:
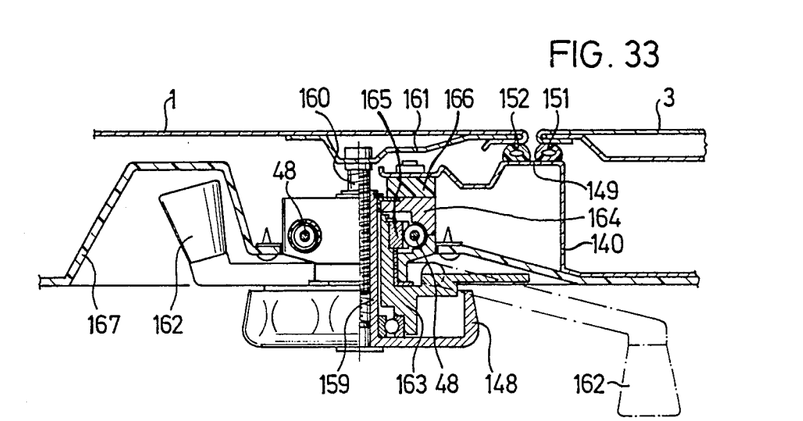
FIG. 33 is a longitudinal section through an operating device for the displacement mechanism according to FIGS. 28 to 32.

Frame 140 has a raised circumferential rim 149 that sits below an edge gap 150 that is formed between the cover 3 and the edge of roof opening 2, when the cover is closed. Attached to rim 149 are an annular cover seal 151 and an adjacent, also annular, frame seal 152. When cover 3 is in the closed position (FIGS. 29 and 33), the cover seal 151 provides a seal between cover 3 and frame 140, while the frame seal 152 produces a similar sealing of frame 140 relative to the fixed roof skin 1. Seals 151 and 152 can be hollow chamber seals as shown in FIG. 33, or they may be combined into a one-piece profiled joint.

The front ventilation link 93 and front ventilation lever 88 of the previous embodiment are eliminated. Link pins 90 and 91 are attached directly on the front end of front sliding carriage 87. Under the cover front edge 4, there is a cover limit stop 153 which lies against a frame wall 154 in the closed and first ventilation positions of the cover (FIGS. 29 and 30), and in positions intermediate these two positions. Compression cam 132 is attached directly to sliding carriage 87.

Cover 3 can be lowered from the closed position of FIG. 29 by turning handle 148 to pivot frame 140 around hinge joint 142, so that its front edge 4 is below the fixed roof skin 1. In this way, in the area of the front edge of the roof opening, the ventilation gap 15 is formed for the passage of air current 26 (FIG. 30).

Figures 28, 29:
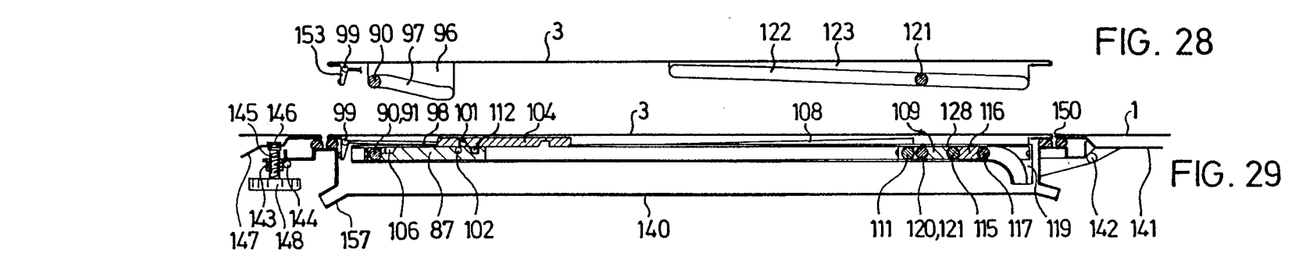
FIGS. 28 to 32 are diagrammatic, longitudinal sections through the motor vehicle roof for a further modified embodiment of the displacement mechanism, FIG. 28 separately showing the cover for the cover position according to FIG. 29.
Figures 30, 31:
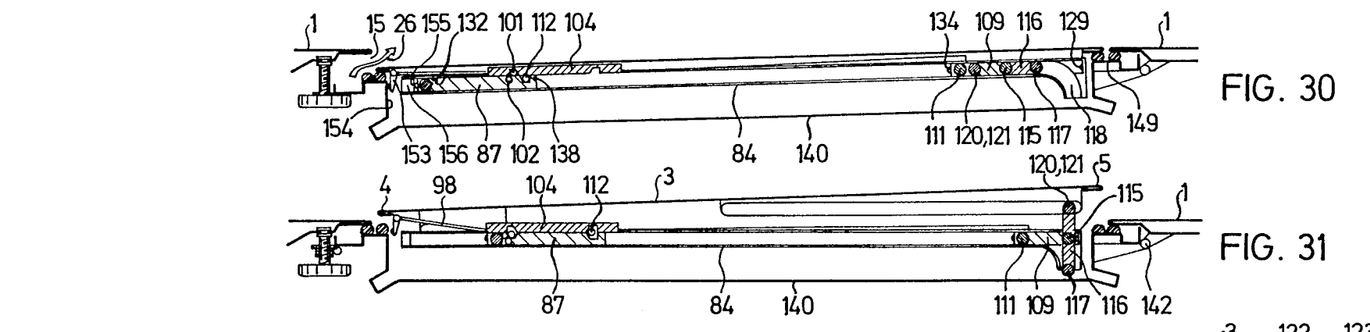

During the transition from the position according to FIG. 29 into the position according to FIG. 30, the sliding carriage 87 remains in its forwardmost position in which a limit stop 155 on the front end of sliding carriage 87 abuts a block 156 of guide rail 84. If the sliding carriage 87 is, then, slid rearward, cover 3 first continues to be held in its forwardmost position by stop bar 98, while the link pin 90 on sliding carriage 87 travels rearwardly and downwardly in guideway 97, thereby raising cover 3, somewhat, in the area of its front edge 4 (FIG. 31). Simultaneously, connecting bar 108 draws sliding carriage 109 along to the rear. In this way, ventilation lever 116 is pivoted and the rear edge of cover 3 is pushed out above fixed roof skin 1, as explained in detail above in connection with FIG. 22.

Figure 32:
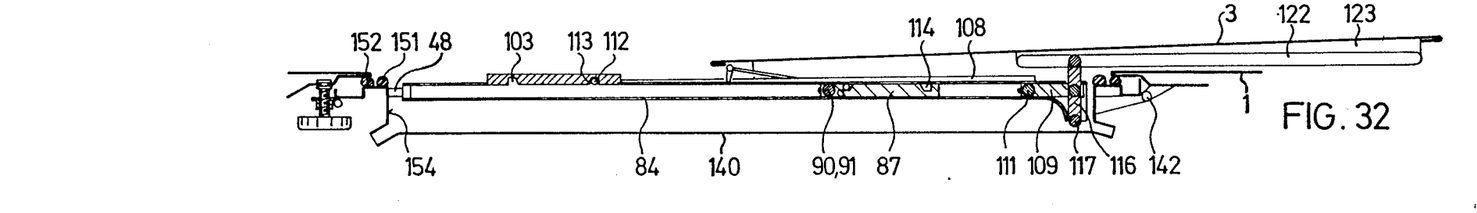

With further rearward travel of front sliding carriage 87, stop 104 releases stop bar 98, while front sliding carriage 87 is decoupled from rear sliding carriage 109, and the rear sliding carriage is held in place by connecting bar 108 by stop 104, as the cover is pushed rearward over fixed roof skin 1 (FIG. 32).

Because, in this embodiment, the first ventilation position, with the cover lowered in front, is reached by pivoting frame 140, guide rail 84 and link track 12 can be made straight. Compared to the embodiments according to FIGS. 4 to 8, the drip molding 8 on the cover front edge is also eliminated. Water is caught, instead, by frame 140 and is drained by drains 157.

Figure 34:
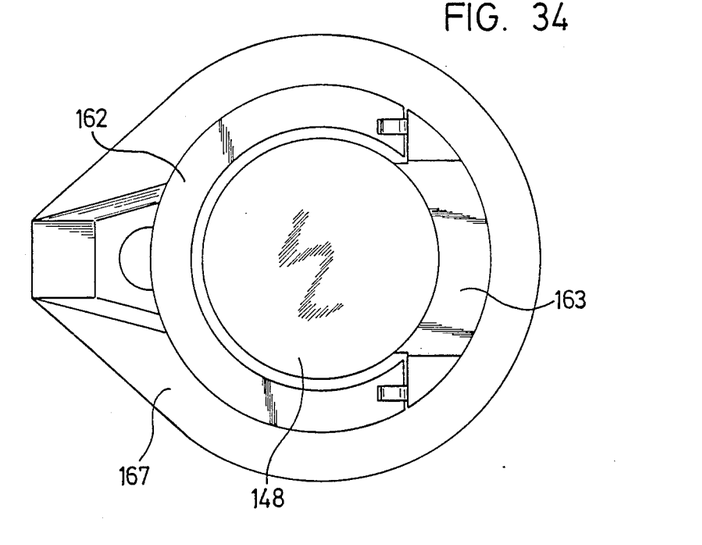
FIG. 34 is a bottom plan view of the operating device of FIG. 33.

An embodiment of a manual drive for the roof according to FIGS. 28 to 32 is shown in FIGS. 33 and 34. The movement of the cover 3 into the first ventilation position (where front edge 4 is lowered) on the one hand, and the pushing out and sliding of the cover, on the other hand, are performed by separate drive elements which, however, are assembled into one unit.

To pivot frame 140, here, an arrangement similar to that shown in FIGS. 29 to 32 is provided. However, in this case, a threaded sleeve 159 is formed on turning handle 148 which is in threaded engagement with a threaded pin 160. The upper end of threaded pin 160 is integrally attached to a reinforcement plate 161 which is integrally joined to the roof so as not to twist. Thus, when handle 148 is turned, threaded sleeve 159 moves upward or downward on the threaded pin 160.

The pushing out and sliding of cover 3 are performed by a folding crank 162 that is connected to pivot on a crank base 163. Crank base 163 is coaxially mounted about threaded pin 160 of turning handle 148, and is rotatable in a crank housing 164. Crank base 163 is fixedly connected to a drive pinion 165, so that it will rotate with the crank base. Drive pinion 165, for its part, is engaged with both drive cables 48. Crank housing 164 is connected by an elastic element 166 to frame 140. Element 166 compensates for the pivoting movement occurring during the lowering of the frame. A headlining covering is represented at 167.

It should be understood that numerous modifications of the embodiments, explained in detail above, are possible within the scope of the invention. For example, for a pivoting connection of frame 140 to a part integral with the roof, such as reinforcement rail 141, instead of joint 142, an elastic intermediate part can be provided. The guide rails can, optionally, assume the function of frame 140, themselves, and for this purpose, may be formed by a suitable extruded section. Instead of the threaded spindle consisting of a threaded sleeve and threaded pin, any other lifting element, for example, in the form of a link, can be provided. Also the drive for the cover can be either manual or mechanical, as desired. Therefore, the invention should be viewed as encompassing the full scope of the appended claims.

We claim:

1. In a motor vehicle roof of the type having a roof opening in a fixed roof skin, a cover by which said opening can be closed and at least partially opened, and a cover displacement means for pivoting of the cover around a pivot axis lying in proximity to its front edge, so as to raise a rear edge of the cover above the fixed roof skin into a raised ventilation position and for, selectively, pushing the cover rearward over the fixed roof skin, once raised in a slid-back position; the improvement wherein said cover displacement means further comprises means for also pivoting the cover generally around a rear edge of the cover into a lowered ventilation position in which the front edge of the cover is lowered below the fixed roof skin.

2. Motor vehicle roof according to claim 1, wherein a means for holding the rear edge of cover at approximately the height of the fixed roof skin when the front edge of the cover is lowered into the lowered ventilation position is provided.

3. Motor vehicle roof according to claim 1, wherein the cover is connected to said displacement means in a manner such that operation of said displacement means in one direction produces movement of the cover, starting from the closed position, first into the lowered ventilation position, then, raises the cover into the raised ventilation position and, finally, slides the cover into said slid-back position, and operation in an opposite direction, from the slidback position, returns the cover to the raised position, then the lowered ventilation position and, finally, brings the cover into the closed position.

4. Motor vehicle roof according to claim 3, wherein said displacement means includes means for causing the front edge of the cover to make an upward movement in association with movement of the cover from the lowered ventilation position toward the slid-back position.

5. Motor vehicle roof according to claim 3, wherein the displacement means comprises, at each side of the roof opening, a control link that is connected with a drive mechanism and is guided to move in a lengthwise direction of the cover, and a sliding carriage for each control link which is also guided to move in said lengthwise direction, said sliding carriage pivotally mounting a front and a rear ventilation lever for pivoting around a respective pivot axis running crosswise to said lengthwise direction, and said ventilation levers having means far engaging in said control link, at one end, and in a respective part that is integral with the cover at an opposite end.

6. Motor vehicle roof according to claim 5, wherein a central area of said ventilation levers is mounted on said sliding carriage; wherein facing ends of the front and rear ventilation levers engage on the control link; and wherein oppositely directed ends of the front and rear ventilation levers engage on said respective part that is integral with the cover.

7. Motor vehicle roof according to claim 5, wherein one of the front and rear ventilation levers is pivoted to one of the respective parts that is integral with the cover, and wherein the other of the said ventilation levers is pivotally and slidably connected with the other of the respective parts integral with the cover.

8. Motor vehicle roof according to claim 5, wherein each of the ventilation levers carries a link pin that engages in a curved track of said control link.

9. Motor vehicle roof according to claim 5, wherein guide rails are placed on both sides of said roof opening and extend in the lengthwise direction of the cover; wherein each said sliding carriage is guided to slide along each said guide rail; and wherein each said control link is mounted to slide on a respective sliding carriage in said lengthwise direction.

10. Motor vehicle roof according to claim 5, wherein each said control link is connected integrally with a pressure-resistant drive cable forming a part of the drive mechanism.

11. Motor vehicle roof according to claim 5, wherein locking means for locking each said sliding carriage against sliding movement, when said cover is in any position between said closed position and said raised ventilation position, is provided.

12. Motor vehicle roof according to claim 11, wherein means for slaving the sliding movements of each sliding carriage to a respective control link is provided.

13. Motor vehicle roof according to claim 12, wherein said locking means comprises a latch that accompanies each sliding carriage in its sliding movements, and which, depending on the sliding movements of the respective control link, alternately engages with a stop that is integral with a fixed element of the roof or with said control link.

14. Motor vehicle roof according to claim 3, wherein the displacement means further comprises a guide arrangement that is integral with the cover, a guide arrangement that is integral with the roof, and a ventilation lever arrangement that interacts with said guide arrangement and that carries link pins which engage in guideways of both guide arrangements.

15. Motor vehicle roof according to claim 14, wherein the cover is in driven connection with a front sliding carriage, that is guided to move in a cover sliding direction, at each side of the roof opening, each said front sliding carriage being connected to a drive mechanism.

16. Motor vehicle roof according to claim 15, wherein a coupling part is provided in proximity to the front edge of the cover that engages the cover and which, during pivoting of the cover between the lowered ventilation position and the raised ventilation position, is kept engaged in a part that is integral with a fixed part of the roof and which, for sliding movement of the cover, is kept engaged in the front sliding carriage.

17. Motor vehicle roof according to claim 14, wherein the ventilation lever arrangement comprises a rear ventilation lever that is pivotally joined to a rear sliding carriage which is guided to move in a cover sliding direction; and wherein, during the pivoting of cover between the lowered ventilation position and the raised ventilation position the rear sliding carriage is coupled by coupling means to the drive mechanism and, during sliding movements of the cover, is kept engaged in a part that is integral with a fixed part of the roof.

18. Motor vehicle roof according to claim 17, wherein the cover is in driven connection with a front sliding carriage, that is guided to move in a cover sliding direction, at each side of the roof opening, each said front sliding carriage being connected to said drive mechanism; and wherein, the coupling means is a carrier that produces a detachable connection between the front and rear sliding carriages.

19. Motor vehicle roof according to claim 18, wherein the ventilation lever arrangement further comprises a front ventilation lever that is pivotally joined to the front sliding carriage.

20. Motor vehicle roof according to claim 1, wherein said cover is mounted for sliding movement upon guide rails; and wherein one of said guide rails and a frame carrying the guide rails is mounted to pivot relative to the fixed roof skin around an axis lying near a rear edge of roof opening as a means for displacing said cover between its closed position and the lowered ventilation position.

21. Motor vehicle roof according to claim 20, wherein a front part of said frame is connected to a lifting device for selective height adjustment of the frame.

22. Motor vehicle roof according to claim 20, wherein an encircling sealing arrangement is carried by said frame at an edge area of the roof opening for producing a seal between the frame and fixed roof surface and between the frame and said cover.

23. Motor vehicle roof according to claim 20, wherein said means for displacing further comprising means for raising the entire cover above the fixed roof skin before the cover is slid rearward.

24. Motor vehicle roof according to claim 20, wherein said means for displacing further comprises an operating device in the form of a component made of a turning handle means for pivoting said frame and a crank handle means for raising and sliding the cover.

25. Motor vehicle roof according to claim 14, wherein the guideways of the guide arrangement that is integral with the cover have a rearwardly descending part which serves as a means for raising the front edge of the cover in association with movement of the cover from the lowered ventilation position toward the slidback position.

26. Motor vehicle roof according to claim 17, wherein means for securing the rear ventilation lever against being unintentionally raised, when the cover is in the closed position, is provided.

27. Motor vehicle roof according to claim 17, wherein said rear ventilation lever has an approximately vertical orientation when the cover is raised at its rear edge.

28. Motor vehicle roof according to claim 1, a fixed inside roof lining is provided under the fixed roof skin which has a lining opening under said roof opening, and a retractable headlining for the lining opening.

29. Motor vehicle roof according to claim 28, wherein said retractable headlining comprises a roller blind device with a roller blind fabric web and a roller for winding the fabric web.

30. Motor vehicle roof according to claim 29, wherein the roller is mounted crosswise to the cover sliding direction, rearward of the roof opening and between the fixed roof skin and the fixed inside roof lining.

31. Motor vehicle roof according to claim 30, wherein the cover is formed of sheet metal, and the roller blind fabric web is slaved to sliding movement of the cover at a front area thereof.

32. Motor vehicle roof according to claim 30, wherein the cover is formed of glass, and wherein said roller blind device is hand operable and provided wit means for fixing the roller blind fabric web in a pulledout position.

33. Motor vehicle roof according to claim 30, wherein the fixed inside roof lining is provided with at least one ventilation screen, said ventilation screen being located in at least one of an area situated in front of the lining opening and an area situated behind the lining opening.

* * * * *